(12) United States Patent
Jerby et al.

(10) Patent No.: US 11,809,065 B2
(45) Date of Patent: Nov. 7, 2023

(54) COMPACT FOLDED CAMERA

(71) Applicant: Corephotonics Ltd., Tel-Aviv (IL)

(72) Inventors: Itay Jerby, Netanya (IL); Itay Yedid, Karme Yosef (IL); Gal Avivi, Haifa (IL); Ephraim Goldenberg, Ashdod (IL); Gil Bachar, Tel-Aviv (IL); Gal Shabtay, Tel-Aviv (IL)

(73) Assignee: Corephotonics Ltd., Tel Aviv (IL)

(*) Notice: Subject to any disclaimer, the term of this patent is extended or adjusted under 35 U.S.C. 154(b) by 280 days.

(21) Appl. No.: 17/110,344

(22) Filed: Dec. 3, 2020

(65) Prior Publication Data
US 2021/0088882 A1    Mar. 25, 2021

Related U.S. Application Data

(63) Continuation of application No. 16/332,946, filed as application No. PCT/IB2017/058403 on Dec. 26, 2017, now Pat. No. 10,884,321.
(Continued)

(51) Int. Cl.
*G03B 17/04* (2021.01)
*G02B 13/00* (2006.01)
(Continued)

(52) U.S. Cl.
CPC ......... *G03B 17/04* (2013.01); *G02B 13/0035* (2013.01); *G02B 27/646* (2013.01); *G03B 3/02* (2013.01); *G03B 2215/0507* (2013.01)

(58) Field of Classification Search
CPC .. G03B 17/04; G03B 3/02; G03B 2215/0507; G02B 13/0035; G02B 27/646
See application file for complete search history.

(56) References Cited

U.S. PATENT DOCUMENTS

| | | |
|---|---|---|
| 4,199,785 A | 4/1980 | McCullough et al. |
| 5,005,083 A | 4/1991 | Grage et al. |
| (Continued) | | |

FOREIGN PATENT DOCUMENTS

| | | |
|---|---|---|
| CN | 101276415 A | 10/2008 |
| CN | 201514511 U | 6/2010 |
| (Continued) | | |

OTHER PUBLICATIONS

Office Action in related JP Patent application 2019-537837, dated Aug. 17, 2021.
(Continued)

*Primary Examiner* — Clayton E. LaBalle
*Assistant Examiner* — Diana Hancock
(74) *Attorney, Agent, or Firm* — Nathan & Associates; Menachem Nathan

(57) ABSTRACT

Folded cameras comprising a movable lens having a lens optical axis and positioned in an optical path between an optical path folding element (OPFE) and an image sensor, wherein the OPFE folds light from a first direction to a second direction, the second direction being substantially along the lens optical axis, and an actuator for controlled lens movement, the actuator including or being attached to a shield partially surrounding the lens, the shield having an opening positioned and dimensioned to enable installation of the lens into the shield from an insertion direction substantially parallel to the first direction. A folded camera disclosed herein may be included together with an upright camera in a dual-camera.

5 Claims, 14 Drawing Sheets

Related U.S. Application Data

(60) Provisional application No. 62/445,271, filed on Jan. 12, 2017.

(51) Int. Cl.
  *G02B 27/64* (2006.01)
  *G03B 3/02* (2021.01)

(56) References Cited

U.S. PATENT DOCUMENTS

| | | |
|---|---|---|
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandl |
| 5,287,093 A | 2/1994 | Amano et al. |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 3,514,491 A1 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1* | 3/2005 | Davis .................... H04N 7/142 348/E7.079 |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1* | 10/2006 | Pak ...................... H04N 5/2254 257/E31.127 |
| 2007/0024737 A1 | 2/2007 | Nakamura et al. |
| 2007/0126911 A1 | 6/2007 | Nanjo |
| 2007/0177025 A1 | 8/2007 | Kopet et al. |

(56) References Cited

U.S. PATENT DOCUMENTS

| | | |
|---|---|---|
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynänen et al. |
| 2010/0202068 A1 | 8/2010 | Ito |
| 2010/0238327 A1 | 9/2010 | Griffith et al. |
| 2010/0246024 A1 | 9/2010 | Aoki et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0148215 A1 | 6/2013 | Mori et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1* | 10/2013 | Nomura ............... G02B 27/646 |
| | | 348/208.11 |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0218799 A1* | 8/2014 | Suzuka ............... G02B 13/0065 |
| | | 359/557 |
| 2014/0313316 A1 | 10/2014 | Olsson et al. |
| 2014/0362242 A1 | 12/2014 | Takizawa |
| 2014/0376090 A1 | 12/2014 | Terajima |
| 2015/0002683 A1 | 1/2015 | Hu et al. |
| 2015/0042870 A1* | 2/2015 | Chan ..................... H04N 23/69 |
| | | 359/733 |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0316744 A1 | 11/2015 | Chen |
| 2015/0334309 A1 | 11/2015 | Peng et al. |
| 2016/0044247 A1* | 2/2016 | Shabtay ............... H04N 5/2258 |
| | | 348/240.3 |
| 2016/0044250 A1* | 2/2016 | Shabtay ................ H04N 5/247 |
| | | 348/240.3 |
| 2016/0070088 A1* | 3/2016 | Koguchi ............... G02B 15/144 |
| | | 359/696 |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0070731 A1 | 3/2017 | Darling et al. |
| 2017/0187962 A1 | 6/2017 | Lee et al. |
| 2017/0214846 A1 | 7/2017 | Du et al. |
| 2017/0214866 A1 | 7/2017 | Zhu et al. |
| 2017/0242225 A1 | 8/2017 | Fiske |
| 2017/0289458 A1 | 10/2017 | Song et al. |
| 2018/0013944 A1 | 1/2018 | Evans, V et al. |
| 2018/0017844 A1* | 1/2018 | Yu ............................ G03B 5/02 |
| 2018/0024329 A1* | 1/2018 | Goldenberg ........ H04N 5/23258 |
| | | 359/557 |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Tang et al. |
| 2018/0241922 A1 | 8/2018 | Baldwin et al. |

(56) References Cited

U.S. PATENT DOCUMENTS

| | | |
|---|---|---|
| 2018/0295292 A1 | 10/2018 | Lee et al. |
| 2018/0300901 A1 | 10/2018 | Wakai et al. |
| 2019/0121103 A1 | 4/2019 | Bachar et al. |

FOREIGN PATENT DOCUMENTS

| | | |
|---|---|---|
| CN | 102739949 A | 10/2012 |
| CN | 103024272 A | 4/2013 |
| CN | 103841404 A | 6/2014 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2003304024 A | 10/2003 |
| JP | 2004133054 A | 4/2004 |
| JP | 2004245982 A | 9/2004 |
| JP | 2005099265 A | 4/2005 |
| JP | 2005122084 A | 5/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2008271026 A | 11/2008 |
| JP | 2010204341 A | 9/2010 |
| JP | 2011085666 A | 4/2011 |
| JP | 2013106289 A | 5/2013 |
| JP | 2017146440 A | 8/2017 |
| KR | 20070005946 A | 1/2007 |
| KR | 20090058229 A | 6/2009 |
| KR | 20100008936 A | 1/2010 |
| KR | 20140014787 A | 2/2014 |
| KR | 101477178 B1 | 12/2014 |
| KR | 20140144126 A | 12/2014 |
| KR | 20150118012 A | 10/2015 |
| WO | 2000027131 A2 | 5/2000 |
| WO | 2004084542 A1 | 9/2004 |
| WO | 2006008805 A1 | 1/2006 |
| WO | 200712914 A1 | 11/2007 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

European Office Action dated Feb. 11, 2021.
Statistical Modeling and Performance Characterization of a Real-Time Dual Camera Surveillance System, Greienhagen et al., Publisher: IEEE, 2000, 8 pages.
A 3MPixel Multi-Aperture Image Sensor with 0.7μm Pixels in 0.11μm CMOS, Fife et al., Stanford University, 2008, 3 pages.
Dual camera intelligent sensor for high definition 360 degrees surveillance, Scotti et al., Publisher: IET, May 9, 2000, 8 pages.
Dual-sensor foveated imaging system, Hua et al., Publisher: Optical Society of America, Jan. 14, 2008, 11 pages.
Defocus Video Matting, McGuire et al., Publisher: ACM SIGGRAPH, Jul. 31, 2005, 11 pages.
Compact multi-aperture imaging with high angular resolution, Santacana et al., Publisher: Optical Society of America, 2015, 10 pages.
Multi-Aperture Photography, Green et al., Publisher: Mitsubishi Electric Research Laboratories, Inc., Jul. 2007, 10 pages.
Multispectral Bilateral Video Fusion, Bennett et al., Publisher: IEEE, May 2007, 10 pages.
Super-resolution imaging using a camera array, Santacana et al., Publisher: Optical Society of America, 2014, 6 pages.
Optical Splitting Trees for High-Precision Monocular Imaging, McGuire et al., Publisher: IEEE, 2007, 11 pages.
High Performance Imaging Using Large Camera Arrays, Wilburn et al., Publisher: Association for Computing Machinery, Inc., 2005, 12 pages.
Real-time Edge-Aware Image Processing with the Bilateral Grid, Chen et al., Publisher: ACM SIGGRAPH, 2007, 9 pages.
Superimposed multi-resolution imaging, Carles et al., Publisher: Optical Society of America, 2017, 13 pages.
Viewfinder Alignment, Adams et al., Publisher: Eurographics, 2008, 10 pages.
Dual-Camera System for Multi-Level Activity Recognition, Bodor et al., Publisher: IEEE, Oct. 2014, 6 pages.
Engineered to the task: Why camera-phone cameras are different, Giles Humpston, Publisher: Solid State Technology, Jun. 2009, 3 pages.
Office action in related Japanese patent application No. 2019-537837, dated Dec. 1, 2020.
Office action in related Korean patent application No. 2020-7027937, dated Jan. 7, 2021.
Office Action in related CN patent application 202111137422.X, dated Oct. 19, 2022.
European Search Report in related EP patent application 22191682.8, dated Jan. 24, 2023.

* cited by examiner

| Step | Cross sections along cut A-A | Cross sections along cut B-B |
|---|---|---|
| Assembly of actuator 108 (known art) | | |
| Step 1: insertion of lens 102 from the top (or alternatively from the bottom) | | |
| Step 2: insertion of OPFE 104 from the top | | Same cut B-B as step 1 |
| Step 3: addition of top lid 110 | | |
| Step 4: installation of image sensor PCB sub-assembly 106 | | Same cut B-B as step 3 |

FIG. 8A

| Step | Cross sections along cut A-A |
|---|---|
| Assembly of actuator 108', except base back side 432 (known art). | |
| Step 1: insertion of lens 102 from the top (or alternatively from the bottom) | |
| Step 2: insertion of OPFE 104 from the top or from the front | |
| Step 2': connection of actuator base back side 432 and other parts of actuator 108' | |
| Step 3: addition of top lid 110 | |
| Step 4: installation of image sensor PCB sub-assembly 106 | |

FIG. 8B

COMPACT FOLDED CAMERA

CROSS REFERENCE TO RELATED APPLICATIONS

This application is a continuation of U.S. patent application Ser. No. 16/332,946 filed Mar. 13, 2019, which was a 371 application from international patent application No. PCT/IB2017/058403 filed Dec. 26, 2017, and is related to and claims the benefit of U.S. Provisional patent application 62/445,271 filed Jan. 12, 2017, which is incorporated herein by reference in its entirety.

FIELD

Embodiments disclosed herein relate in general to digital cameras and in particular to thin folded optics cameras.

BACKGROUND

In recent years, mobile devices such as cell-phones (and in particular smart-phones), tablets and laptops have become ubiquitous. Many of these devices include one or two compact cameras including, for example, a main rear-facing camera (i.e. a camera on the back side of the device, facing away from the user and often used for casual photography) and a secondary front-facing camera (i.e. a camera located on the front side of the device and often used for video conferencing).

Although relatively compact in nature, the design of most of these cameras is similar to the traditional structure of a digital still camera, i.e. it comprises a lens assembly (or a train of several optical elements) placed on top of an image sensor. The lens assembly (also referred to as "lens module" or simply "lens") refracts the incoming light rays and bends them to create an image of a scene on the sensor. The dimensions of these cameras are largely determined by the size of the sensor and by the height of the optics. These are usually tied together through the focal length ("f") of the lens and its field of view (FOV)—a lens that has to image a certain FOV on a sensor of a certain size has a specific focal length. Keeping the FOV constant, the larger the sensor dimensions the larger the focal length and the optics height.

The assembly process of a traditional camera typically includes handling of a few sub-assemblies: a lens, a sensor board sub-assembly and an actuator. The lens is typically made of plastic and includes a few (3-7) lens elements typically made of plastic or glass. The sensor board sub-assembly typically includes the image sensor, a printed circuit board (PCB) and electronics needed for the operation of the camera, as known in the art. The actuator is used for several purposes: (1) it serves as a chassis for the camera, on which other parts are installed, (2) it is used to move the lens for optical needs, for example for focusing and in particular auto focusing (AF) and/or optical image stabilization (OIS), and (3) it is used for mechanical protection of the other parts of the camera. In known art, the lens is inserted and attached (e.g. glued) to the actuator from one side, along the lens optical axis, whereas the sensor board is attached (e.g. glued) to the actuator from the opposite side along the optical axis.

Recently a "folded camera module" has been suggested to reduce the height of a compact camera. In the folded camera module, an optical path folding element (referred to hereinafter as "OPFE") e.g. a prism or a mirror (otherwise referred to herein collectively as "reflecting element") is added in order to tilt the light propagation direction from perpendicular to the smart-phone back surface to parallel to the smart-phone back surface. If the folded camera module is part of a dual-aperture camera, this provides a folded optical path through one lens assembly (e.g. a Tele lens). Such a camera is referred to herein as "folded-lens dual-aperture camera" or "dual-aperture camera with a folded lens". In general, the folded camera module may be included in a multi-aperture camera, for example together with two "non-folded" (upright) camera modules in a triple-aperture camera.

A small height of a folded camera module (or simply "folded camera") is important to allow a host device (e.g. a smartphone, tablets, laptops, smart TV) that includes it to be as thin as possible. The height of the camera is limited many times by the industrial design. In contrast, increasing the available height for the lens, sensor and OPFE may improve optical properties. Therefore, there is a need for having a folded camera in which the height of the lens is maximal for a given camera height, and/or the height of the image sensor active area is maximal for a given camera height, and/or the height of OPFE is maximal for a given camera height.

SUMMARY

Embodiments disclosed herein relate to thin folded cameras.

In various exemplary embodiments, there are provided folded cameras comprising a movable lens positioned in an optical path between an OPFE and an image sensor, wherein the OPFE folds light from a first direction to a second direction and wherein the lens has a lens optical axis substantially parallel to the second direction and a lens height substantially aligned with the first direction; a shield partially surrounding the lens and having a shield thickness, wherein the shield is part of an actuator and includes top and bottom parts with respective top and bottom surfaces that lie in planes that are substantially perpendicular to the first direction, and wherein one of the shield top or bottom parts has a respective opening; and a lid having a first lid thickness and covering the opening in the shield, wherein the folded camera has a camera height substantially equal to a sum of the lens height, the first lid thickness, the shield thickness, the size of a first air gap between a first point on a surface of the lens facing the lid and the size of a second air gap being between a second point on a surface of the lens diametrically opposed to the first point and facing the shield.

Note that as used hereinafter, the terms "top" and "bottom" refer to certain positions/directions: "top" indicates a side of the folded camera or a component of the folded camera in a direction facing a photographed object of interest (not shown), while "bottom" indicates a side of the folded camera or a component of the folded camera in a direction facing away from (opposite from) a photographed object of interest. In other words, the terms "top" and "bottom" refer to positioning of parts/elements/components lying in planes perpendicular to an axis 112 (see FIG. 1A below), where "top" is in a plane closer to the object of interest for photography and "bottom" is in a plane further away from the object of interest for photography than the top plane.

In an exemplary embodiment, the other of the top or bottom parts of the shield includes a respective second opening covered by a lid with a respective second lid thickness, the second air gap is between the second point and the second lid and the second lid thickness replaces the shield thickness.

In an exemplary embodiment, each air gap is in the range of 10-50 µm. In an exemplary embodiment, each air gap is in the range of 10-100 µm. In an exemplary embodiment, each air gap is in the range of 10-150 µm.

In an exemplary embodiment, a folded camera further comprises a lens carrier for holding the lens, the lens carrier having a V-groove structure for mechanically positioning the lens in a correct position inside the shield.

In an exemplary embodiment, the opening in the shield is dimensioned to enable insertion of the lens into the shield in a direction parallel to the first direction and perpendicular to the lens optical axis.

In an exemplary embodiment, the image sensor is wire bonded to a printed circuit board with wire bonds located on sides of the image sensor that are substantially perpendicular to the lid and to the opposite surface of the shield.

In an exemplary embodiment, the movable lens is movable for focusing.

In an exemplary embodiment, the movable lens is movable for optical image stabilization.

In various embodiments, the folded camera has a height not exceeding the lens height by more than 800 µm. In an embodiment, the folded camera has a height not exceeding the lens height by more than 700 µm. In an embodiment, the folded camera has a height not exceeding the lens height by more than 600 µm.

In an exemplary embodiment, there is provided a folded camera comprising a movable lens having a lens optical axis and positioned in an optical path between an OPFE and an image sensor, wherein the OPFE folds light from a first direction to a second direction, the second direction being substantially along the lens optical axis, and an actuator for controlled lens movement, the actuator including a shield partially surrounding the lens and having an opening positioned and dimensioned to enable installation of the lens into the shield from an insertion direction substantially parallel to the first direction.

In an exemplary embodiment, a folded camera further comprises a lens carrier for holding the lens, the lens carrier having a V-groove structure for mechanically positioning the lens in a correct position during installation.

In an exemplary embodiment, there is provided a folded camera comprising a lens positioned in an optical path between an optical path folding element and an image sensor, the lens having a lens height and an optical axis, wherein the folded camera has a height not exceeding the lens height by more than 600 µm.

In an exemplary embodiment, there is provided a folded camera comprising a lens positioned in an optical path between an OPFE and an image sensor, wherein the OPFE folds light from a first direction to a second direction and wherein the image sensor is wire bonded to a printed circuit board with wire bonds located on sides of the image sensor that are substantially parallel to the first direction.

In various embodiments, a folded camera as above and as described below is included together with an upright camera in a dual-camera.

In various exemplary embodiments, there are provided methods for assembling a folded camera, comprising providing an actuator for the folded camera, the actuator having a shield, inserting a lens of the folded camera into the actuator through an opening in the shield, the lens having a lens optical axis, inserting an OPFE into the actuator, wherein the OPFE folds light arriving from a first direction to a second direction, wherein the top surface of the shield faces the light from the first direction and wherein the lens optical axis is substantially parallel to the second direction, covering the shield opening with a lid, and attaching an image sensor of the folded camera to the actuator.

In an exemplary embodiment, the covering the shield opening with a lid includes fixedly attaching the lid to the shield.

In an exemplary embodiment, the opening is a top opening in the shield, and wherein the inserting the OPFE into the actuator includes inserting the OPFE from a top surface of the actuator.

In an exemplary embodiment, the opening is a top opening in the shield, and wherein the inserting the OPFE into the actuator includes inserting the OPFE from a bottom surface of the actuator.

In an exemplary embodiment there is provided a method for assembling a folded camera, comprising: providing an actuator for the folded camera, the actuator having a shield and a base separated into a back base part and a front base part; inserting a lens of the folded camera into the actuator through an opening in the shield, the lens having a lens optical axis; inserting an OPFE into the actuator back base part, wherein the OPFE folds light arriving from a first direction to a second direction, wherein the top surface of the shield faces the light from the first direction and wherein the lens optical axis is substantially parallel to the second direction; attaching the back base part to the front base part; covering the shield opening with a lid; and attaching an image sensor of the folded camera to the actuator.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein, and should not be considered limiting in any way. In the drawings:

FIG. 8A shows schematically steps in the assembly of a folded camera according to an example embodiment;

FIG. 8B shows schematically steps in the assembly of a folded camera according to another exemplary embodiment.

DETAILED DESCRIPTION

Figure 1A:
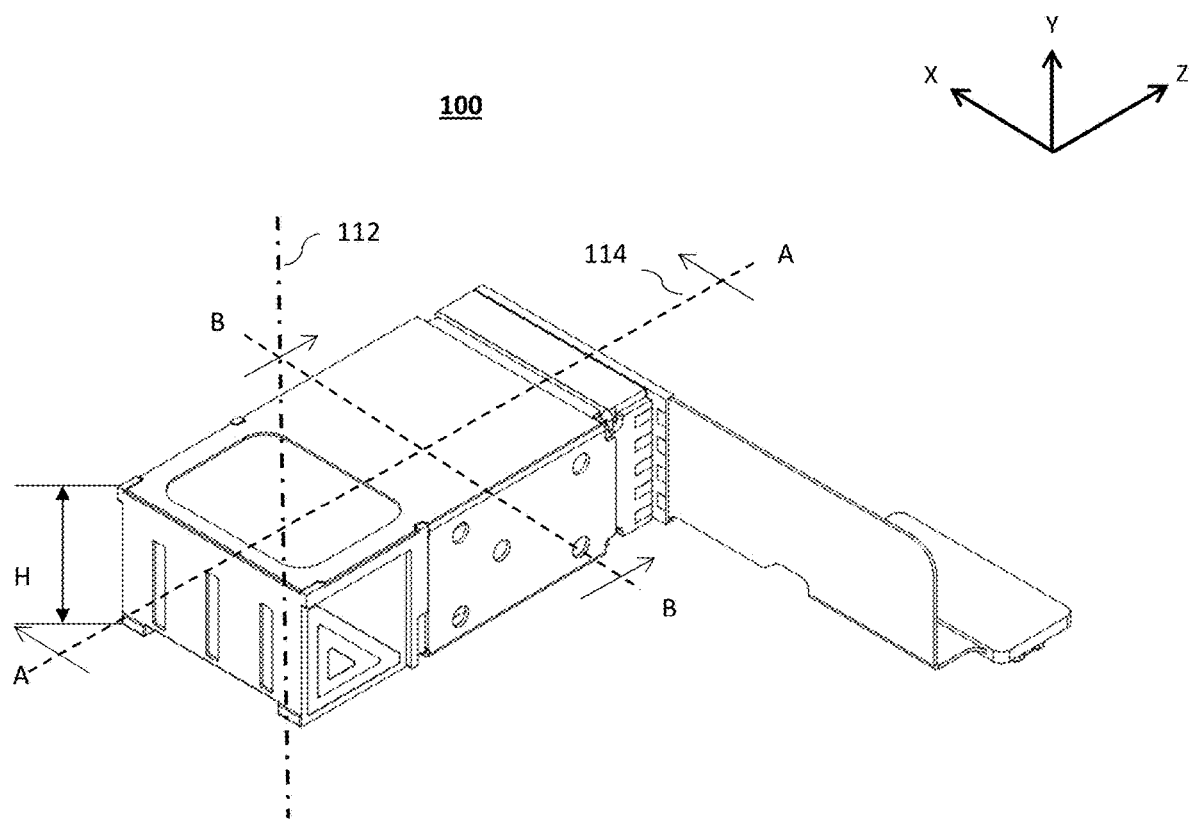
FIG. 1A shows describe an example of a folded camera disclosed herein.
Figure 1B:
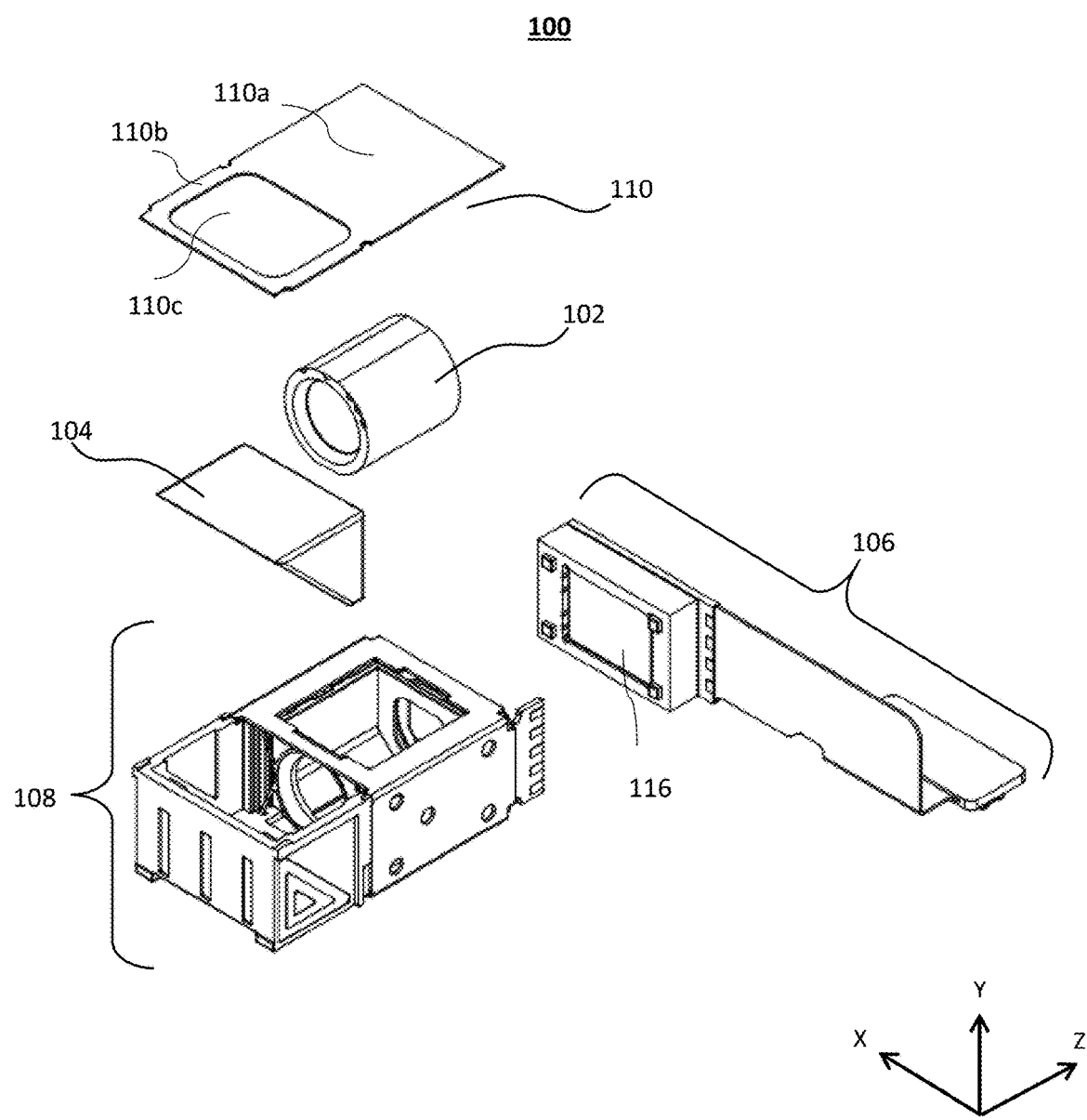
FIG. 1B shows the folded camera of FIG. 1A separated into several parts and sub-systems or sub-assemblies.

FIG. 1A shows an embodiment of a folded camera numbered 100 in an isometric view. An orthogonal X-Y-Z coordinate ("axis") system shown applies also to all following drawings. This coordinate system is exemplary. FIG. 1B shows camera 100 separated into several parts and sub-systems or sub-assemblies: a lens assembly (or simply "lens") 102, an optical path folding element (OPFE) 104, an image sensor-PCB sub-assembly 106, an actuator 108 and a top lid 110. Top lid 110 includes a section 110a and a section 110b, the latter having an opening 110c. In some embodiments (such as in FIGS. 1A and 1B), section 110a and a section 110b are part of a single plate (lid 110).

Figures 1C, 1D:
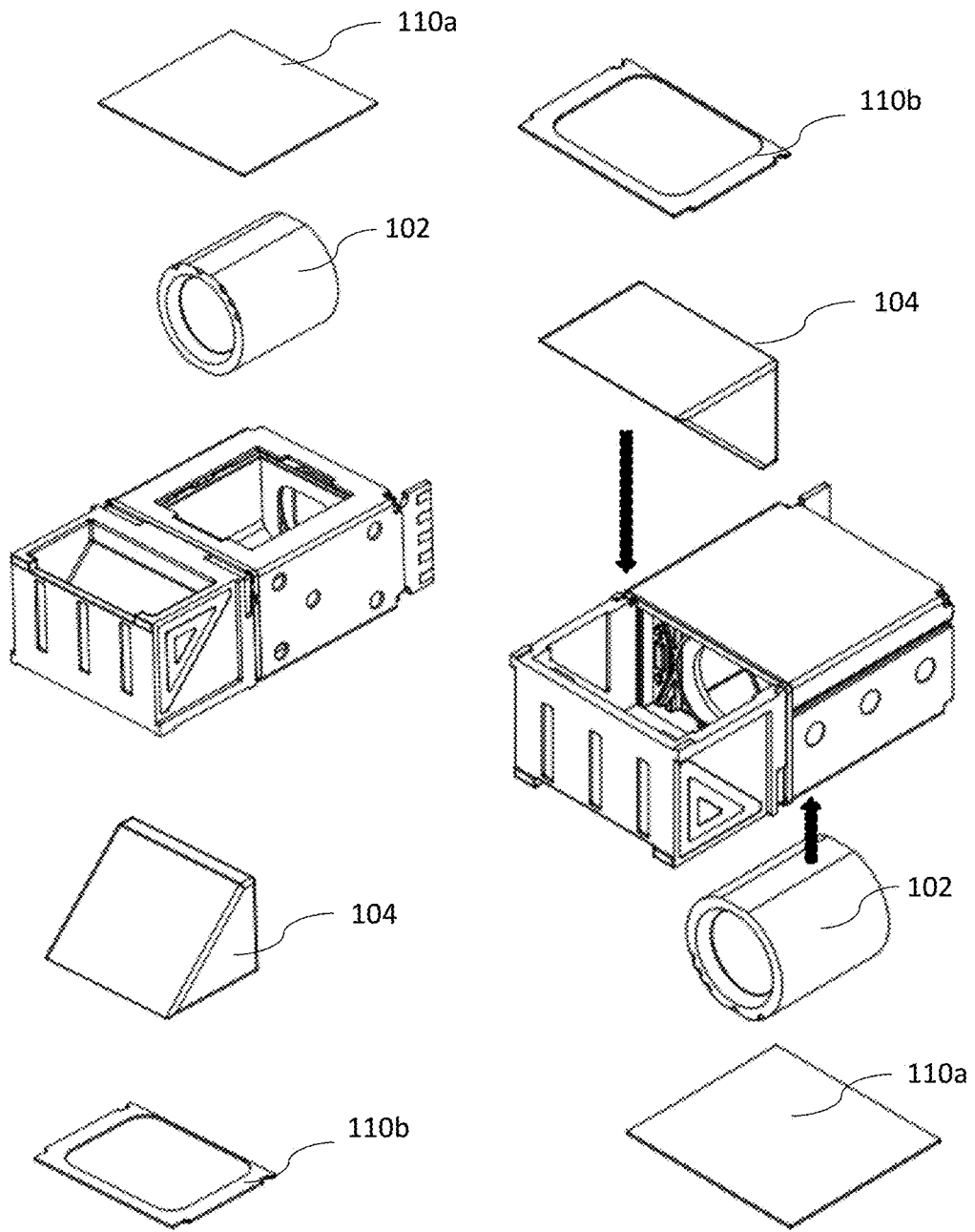
FIG. 1C shows one embodiment of the actuator of the folded camera of FIG. 1A with opposite lens and OPFE directions of insertion into the actuator.
FIG. 1D shows another embodiment of the actuator of the folded camera of FIG. 1A with same lens and OPFE directions of insertion into the actuator.

In some embodiments (such as in FIGS. 1C and 1D) section 110a and a section 110b are separate parts of lid 110. OPFE 104 folds an optical path along an axis 112 parallel to the Y axis (in the exemplary coordinate system) from an object (not shown) into an optical path along an axis 114 parallel to the Z axis (in the exemplary coordinate system). Axis 114 is the optical axis of lens 102. An image sensor 116 included in sub-assembly 106 has a plane normal substantially aligned with axis 114. That is, image sensor 116 lies in a plane substantially perpendicular to axis 114. FIG. 1C shows one embodiment of camera 100 with opposite lens and OPFE directions of insertion into actuator 108, while FIG. 1D shows another embodiment of camera 100 with same lens and OPFE directions of insertion into actuator 108. As used herein with reference to a direction, "substantially" may refer to an exact alignment to the direction, or to a deviation of up to 0.5 degree, up to 1 degree, up to 5 degrees or even to 10 degrees.

Top lid 110 is made for example of metal, e.g. a non-ferromagnetic stainless-steel sheet, with typical thickness of 50-300 μm. Top lid 110 is positioned on a top side of actuator 108, after the assembly of actuator 108 and after the installation of lens 102 and OPFE 104 in actuator 108. Top lid 110 is close to touching the top surface of OPFE 104 during installation (a nominal gap of 10-30 μm). Opening 110c is designed such that light coming from an object will pass through it and reach OPFE 104.

Details of lens 102 are shown in and described with reference to FIGS. 2A-2D. Details of sub-assembly 106 are shown in, and described with reference to FIGS. 3A-3B. Details of actuator 108 are shown in, and described with reference to FIGS. 4A-C.

The height H of camera 100 is defined along the Y axis (direction of axis 112), from a lowermost end to an uppermost end, excluding a flex PCB 304 and a connector 306 (see below—FIG. 3B). H is an important figure of merit in commercial applications. Therefore, reducing H for a given lens size to be as small as possible is a major design goal. Alternatively, maximizing the lens size for a given H is a major design goal.

Figure 2A:
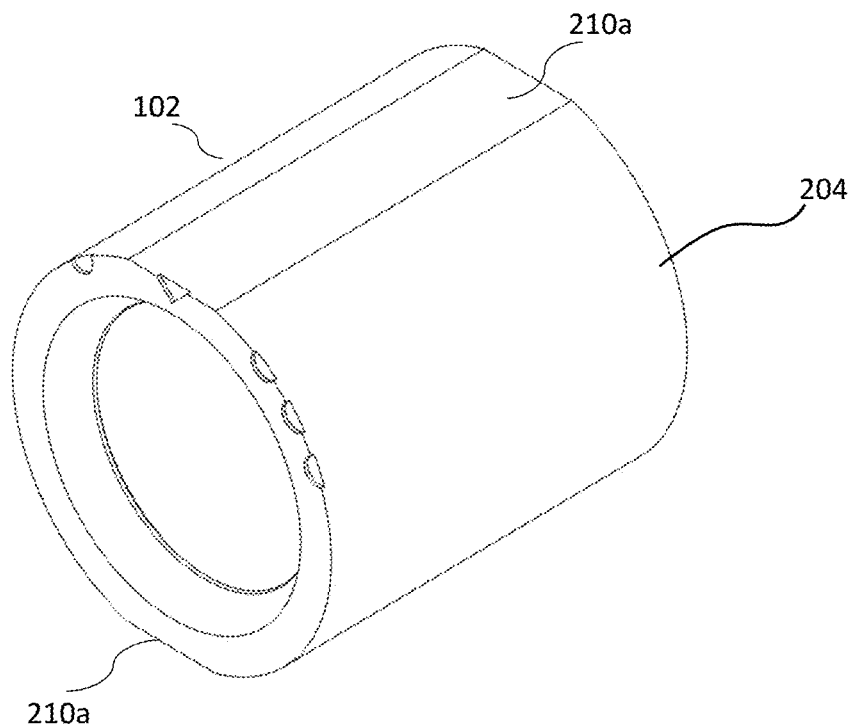
FIG. 2A shows the lens of the folded camera of FIG. 1A in an isometric view.
Figure 2B:
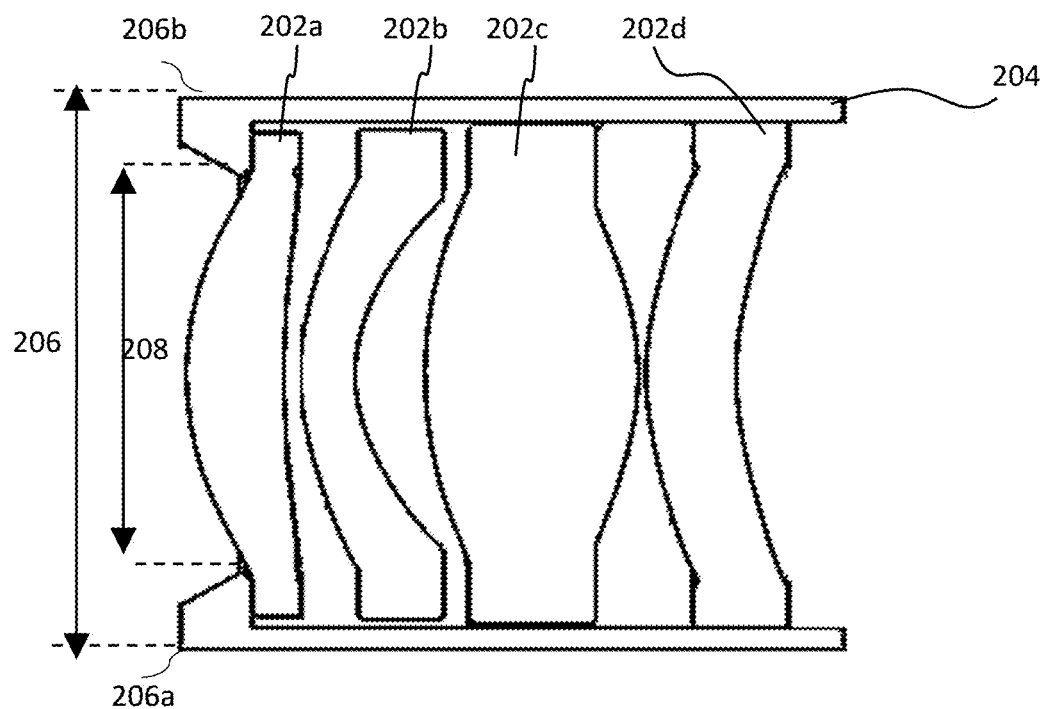
FIG. 2B shows the lens of the folded camera of FIG. 1A in a longitudinal cross section.
Figure 2C:
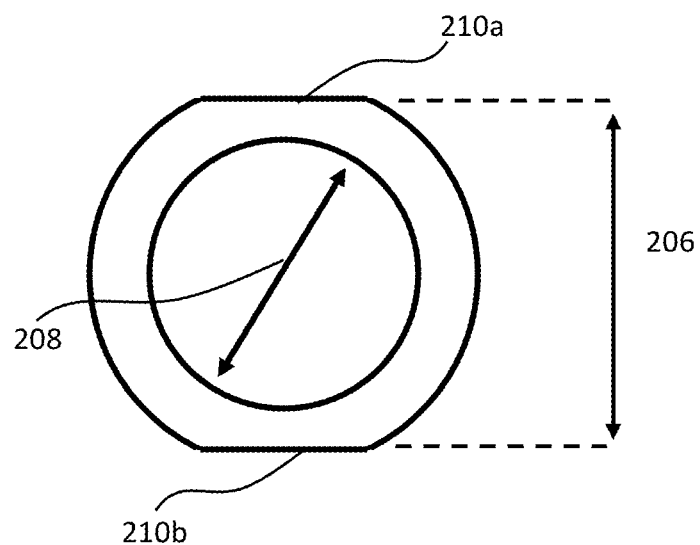
FIG. 2C shows an embodiment of the lens of the folded camera of FIG. 1A having top and bottom flat facets in a radial cross section.
Figure 2D:
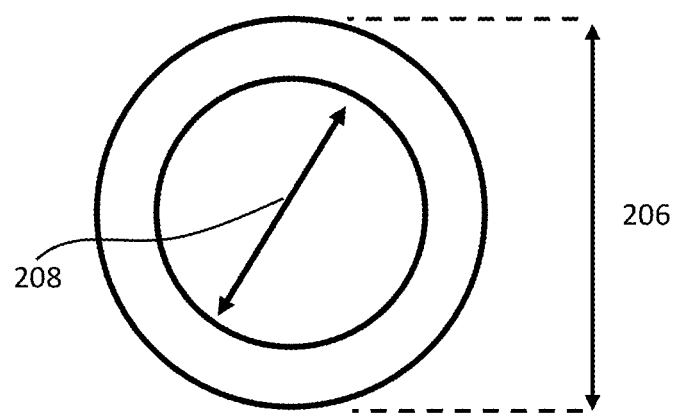
FIG. 2D shows an embodiment of the lens of the folded camera of FIG. 1A without top and bottom flat facets in a radial cross section.

FIG. 2A shows lens 102 in an isometric view, FIG. 2B shows lens 102 in a longitudinal cross section, and FIGS. 2C and 2D show lens 102 in radial cross sections, respectively with and without flat facets on top and bottom external lens surfaces. Lens 102 includes several lens elements 202a-d (in general typically 3-8, with FIG. 2A showing as an example four), each lens element made for example of plastic or glass molding. Lens elements 202a-d are held in a lens barrel 204, made for example of plastic molding. A lens height (or "external diameter" in case of a cylindrically shaped lens) 206 is defined as the distance along the Y axis (or in the same direction as camera height H) from a lowermost point 206a on an external surface of lens 102 to an upper-most point 206b on the external surface of lens 102. Typically, points 206a-b are located on lens barrel 204, namely the height of lens 102 is limited by lens barrel 204. In some embodiments, at least one of lens elements 202a-d may extend outside of lens barrel 204. In such embodiments, the height of lens 102 may be limited by one or more of elements 202a-d and/or by lens barrel 204. An optical aperture 208 of lens 102 is defined as the diameter of the opening in lens 102 toward the OPFE (104) side, as known in the art. Optical aperture 208 determines many properties of the optical quality of lens 102 and of camera 100, as known in the art. The lens design is targeted to maximize optical aperture 208 vs. the lens height. Lens 102 typically has a general cylindrical shape, with a diameter larger than optical aperture 208 by, typically, 600 μm-2600 μm. In some embodiments, two flat facets 210a-b can be provided in the external surface (envelope) of lens 102 on its top and bottom sides, such as to reduce lens height 206 by, typically, 50-200 μm per facet, i.e. by a total of 100-400 μm. In such embodiments, the flat facets coincide with the lowermost and uppermost points 206a-b. The radial cross sections in FIGS. 2C and 2D show the lens with (FIG. 2C) and without (FIG. 2D) flat facets. The lens height (external diameter) reduction does not change the size of optical aperture 208.

Figure 3A:
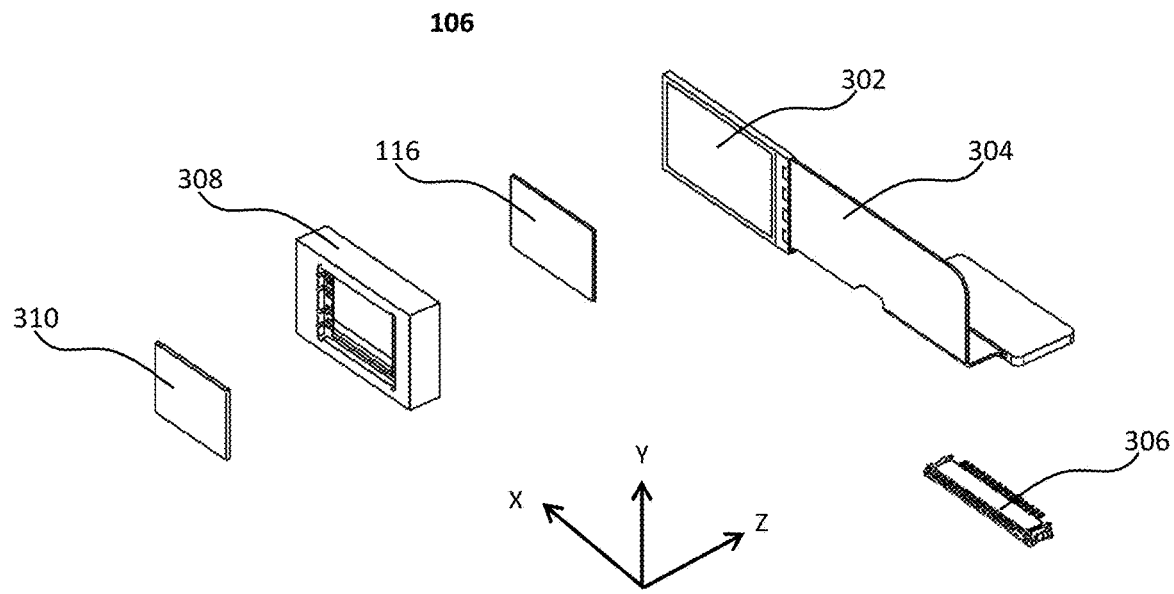
FIG. 3A shows an image sensor-PCB sub-assembly of the folded camera of FIG. 1A in an exploded view.

FIG. 3A shows image sensor-PCB sub-assembly 106 in an exploded view. Sub-assembly 106 includes image sensor 116, a rigid sensor PCB 302, flex PCB 304, a connector 306, a bracket 308 and an IR filter 310. Image sensor 116, typically made of silicon as known in the art, is first mechanically attached (glued) and then electrically wire bonded to rigid sensor PCB 302. In order to minimize the camera height H and to maximize the height (dimension along Y) of image sensor 116, wire bonds 312 on image sensor 116 are located only on its two sides (along the X direction). The positioning of wire bonds 312 only to the sides of image sensor 116 allows rigid sensor PCB 302 not to exceed camera height H, as defined below. Thus, H can be minimized for a given PCB size or, alternatively, the PCB size can be maximized for a given H.

Figure 3B:
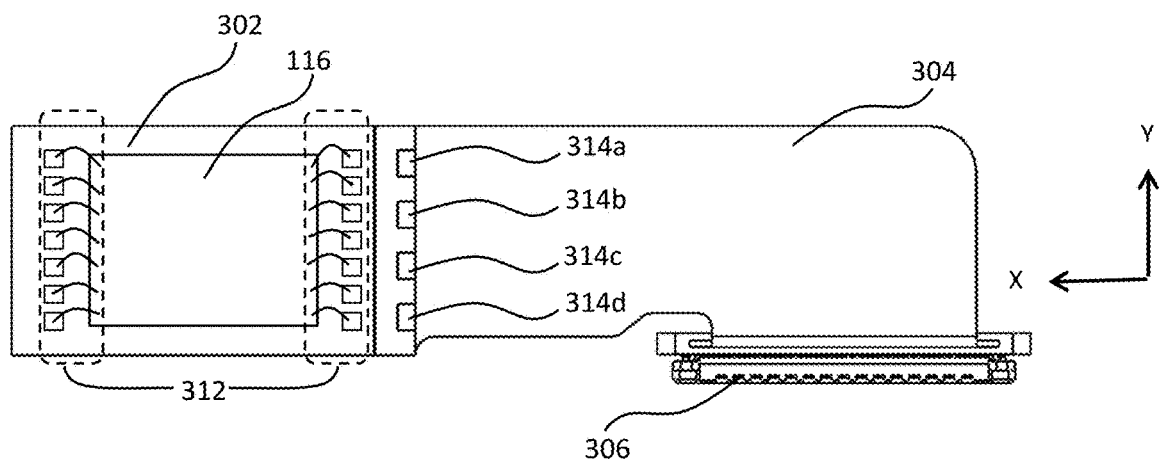
FIG. 3B shows a rigid sensor PCB and an image sensor with wire bonds in the image sensor-PCB sub-assembly of FIG. 3A.

FIG. 3B shows rigid sensor PCB 302 and image sensor 116 with wire bonds 312. Rigid sensor PCB 302 further includes four wiring pads 314a-d, which are positioned next to wiring pads 452a-d (FIG. 4C) to pass electrical signals to an IC driver 450 (FIG. 4B), as described below. As known, rigid sensor PCB 302 and flex PCB 304 may be made as one unit in a rigid-flex technology. Rigid sensor PCB 302 had rigid mechanical properties which allow mounting of sensor 116 and other optional electronic components such as capacitors, resistors, memory IC, etc. (not shown in the figures). Rigid sensor PCB 302 may have several (typically 2-6) metal (e.g. copper) layers and a thickness of 200 μm or more. Flex PCB 304 has flexible mechanical properties, which allows it to bend such that the position of connector 306 does not increase the height H of camera 100. Flex PCB 304 may have only two copper layers and a thickness of 50-100 μm. These and other fabrication considerations for rigid, flex and rigid-flex PCBs are known in the art.

Connector 306 is a board to board connector, as known in the art. Connector 306 is soldered to PCB 304 and allows sending and receiving digital signals required for the operation of image sensor 116 and IC driver 450 from the host device in which the camera is installed. The host may be for example a cell phone, a computer, a TV, a drone, smart eye glasses, etc.

Camera 100 has the ability to actuate (move) lens 102 along its optical axis 114 for the purpose of focusing or auto focusing (AF), as known in the art. Focusing actuation is done using actuator 108, which is described now in more detail with reference to FIGS. 4A-4C.

Figure 4A:
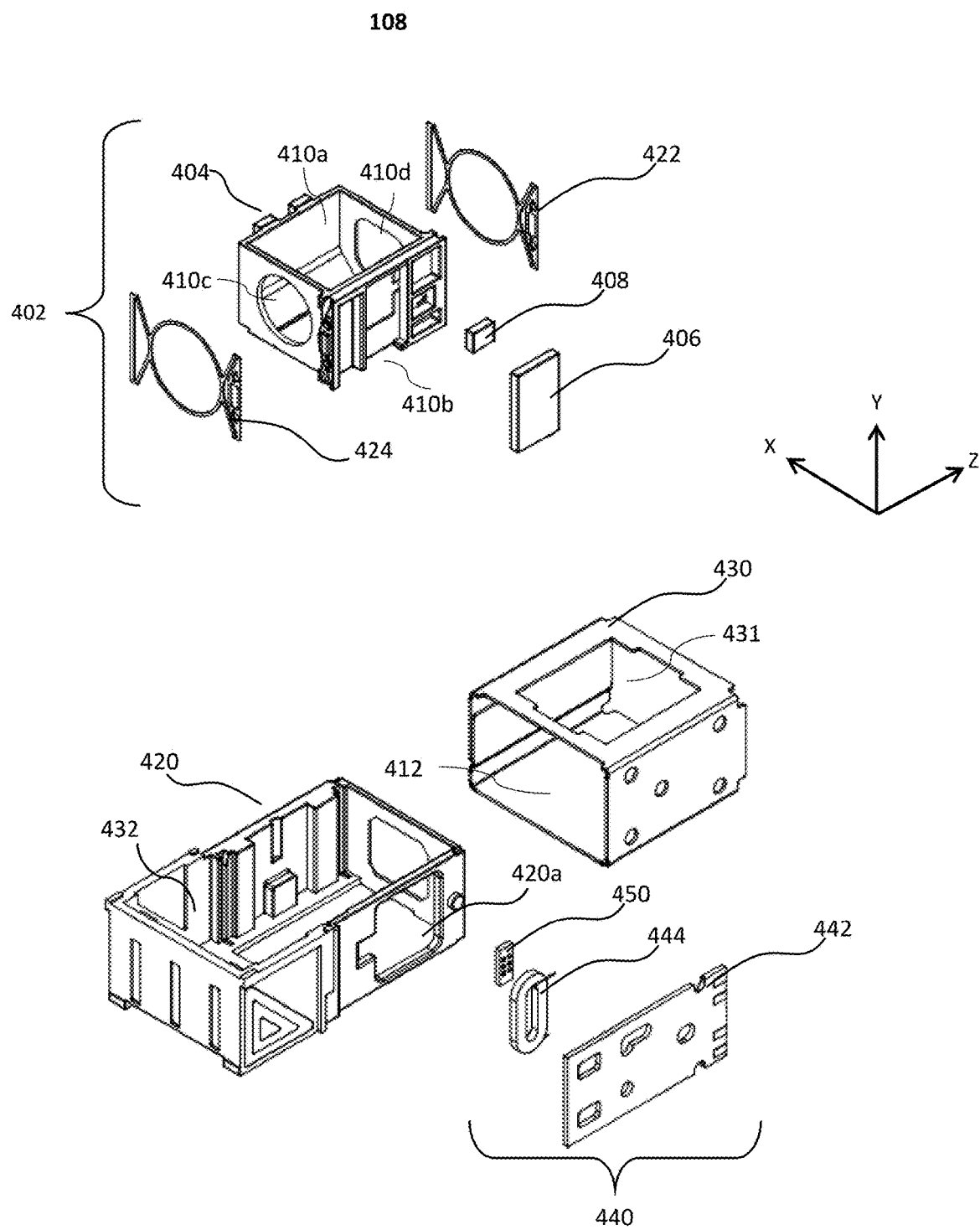
FIG. 4A shows an exploded view of an actuator of the folded camera of FIG. 1A.

FIG. 4A shows an exploded view of actuator 108. Actuator 108 includes an actuated-sub assembly 402. Actuated-sub assembly 402 includes a lens carrier 404, typically made of plastic, an actuation magnet 406 and a sensing magnet 408. Magnets 406 and 408 can be for example permanent magnets, made from a neodymium alloy (e.g. $Nd_2Fe_{14}B$) or a samarium-cobalt alloy (e.g. $SmCo_5$). Magnet 406 can be fabricated (e.g. sintered) such that it changes the magnetic poles direction: on the positive Z side the north magnetic pole faces the negative X direction, while on the negative Z side the north-pole faces the positive X direction. Magnet 408 can be fabricated (e.g. sintered) such that its north magnetic pole faces the negative Z direction. Magnets 406 and 408 are fixedly attached (e.g. glued) to lens carrier 404 from the side (X direction). In other embodiments, magnets 406 and/or 408 may be attached to lens carrier 404 from the bottom (negative Y direction). The magnetic functions of magnets 406 and 408 are described below.

Lens carrier 404 houses lens 102 in an internal volume. Lens carrier 404 has a top opening (or gap) 410a, a bottom opening (or gap) 410b, a front opening 410c and a back opening 410d. Top opening 410a is made such that lens 102 can be inserted in (i.e. pass through) it during the assembly process. Openings 410a and/or 410b are designed such that when lens 102 is located inside lens carrier 404 there are no other parts between the lowermost and/or uppermost points (e.g. 206a-b) in lens 102 and, respectively, a bottom lid 412 and top lid 110. Openings 410c and 410d are dimensioned such that lens carrier 404 would not interfere with light coming from the OPFE to the image sensor. That is, openings 410c and 410d are made such that (1) any ray of light coming from the OPFE and which would have reached sensor 116 through the lens 102 if lens carrier 404 did not exist, will reach sensor 116 passing through openings 410c-d, and (2) any ray of light coming from the OPFE and which would have not reached sensor 116 through the lens if lens carrier 404 did not exist, will not reach sensor 116. In addition, in some embodiments, actuated sub-assembly 402 may be designed such that there is no point on actuated sub-assembly 402 higher than point 206a and there is no point on actuated sub-assembly 402 lower than point 206b. This feature ensures that height H of camera 100 is limited only by lens height 206.

Actuator 108 further includes a base 420, made for example of plastic or of a liquid crystal polymer. Actuated sub-assembly 402 is suspended over base 420 using two springs: a front spring 422 and a back spring 424. Springs 422 and 424 can be made for an example from stainless-steel or beryllium-copper. Springs 422 and 424 are designed such that they form a linear rail along the Z axis, namely that they have a low spring coefficient along the Z axis and a high spring coefficient in other directions: Y axis, X axis, and rotations around X, Y and Z axes. Using two springs to create a linear rail is known in the art, however springs 422 and 424 are designed such that their suspension point on base 420 is on one side (positive X axis) and their suspension point on lens carrier 404 is on the other side (negative X axis). Furthermore, each of springs 422 and 424 has an open circular part. The described design of springs allows to the following properties: (1) achieve desired linear rail properties; (2) the springs do not sacrifice optical properties of camera 100 by blocking any light coming from the OPFE to the image sensor; (3) a spring does not reflect any ray of light coming from the OPFE or from lens 102 that it would arrive at the sensor; (4) none of the suspensions of springs 422 and 424 is along the Y axis, and thereby no additional height is needed or used for the suspensions; and (5) the springs may withstand drop of the camera In some embodiments, actuator 108 further includes integrally a shield 430, typically made of a folded non-ferromagnetic stainless-steel sheet, with typical thickness of 100-300 μm. In other embodiments, camera 100 may include a shield similar to shield 430 which is fixedly attached to camera 100 and/or to actuator 108 at some stage of assembly. Regardless of whether the shield is integral to the actuator or a separate part fixedly attached to the actuator, the description herein refers to the shield as being "part" of the actuator. Shield 430 surrounds base 420 and actuated sub-assembly 402 on four sides, see also FIG. 1B. Some sections of the shield may have openings, while other may be without openings. For example, an opening 431 in the top part of the shield allows the installation of lens 102 in actuator 108. In some embodiments, top lid 110 and bottom lid 412 are the only parts that add (in addition to the lens) to camera height H. In some embodiments (as in FIG. 4A) bottom lid 412 is part of shield 430, while in other embodiments, bottom lid 412 can be separated from shield 430. In some embodiments, shield 430 may have varying thicknesses, in the range given above, while the bottom lid 412 thickness is kept in the range of 50-200 μm.

In camera 100, OPFE 104 is positioned in a back side 432 (negative Z) of base 420. FIG. 4D shows another embodiment of an actuator disclosed herein, numbered 108'. In actuator 108', base 420 is separated into two parts: a base back side 432 and a base back front side 433. In actuator 108', OPFE 104 is installed in-base back side 432, and then base back side 432 is attached (e.g. glued) to other parts of actuator 108'.

Figure 4B:
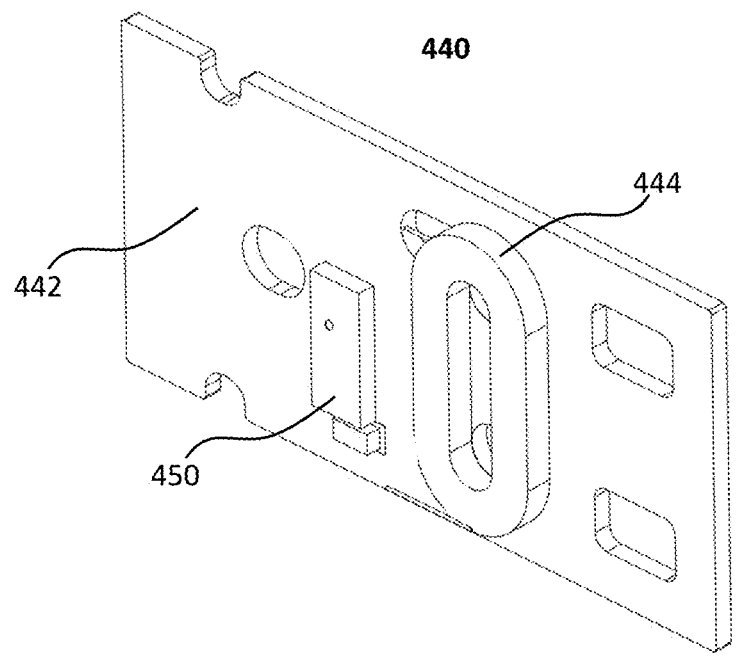
FIG. 4B shows an electronic sub-system of the folded camera of FIG. 1A from one side.
Figure 4C:
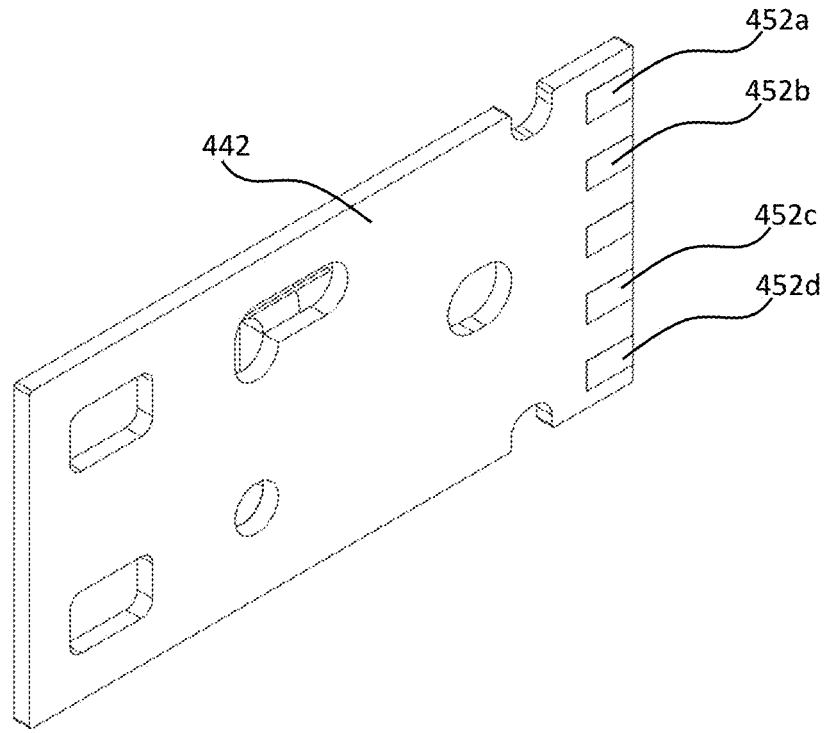
FIG. 4C shows an electronic sub-system of the folded camera of FIG. 1A from another side.
Figure 4D:
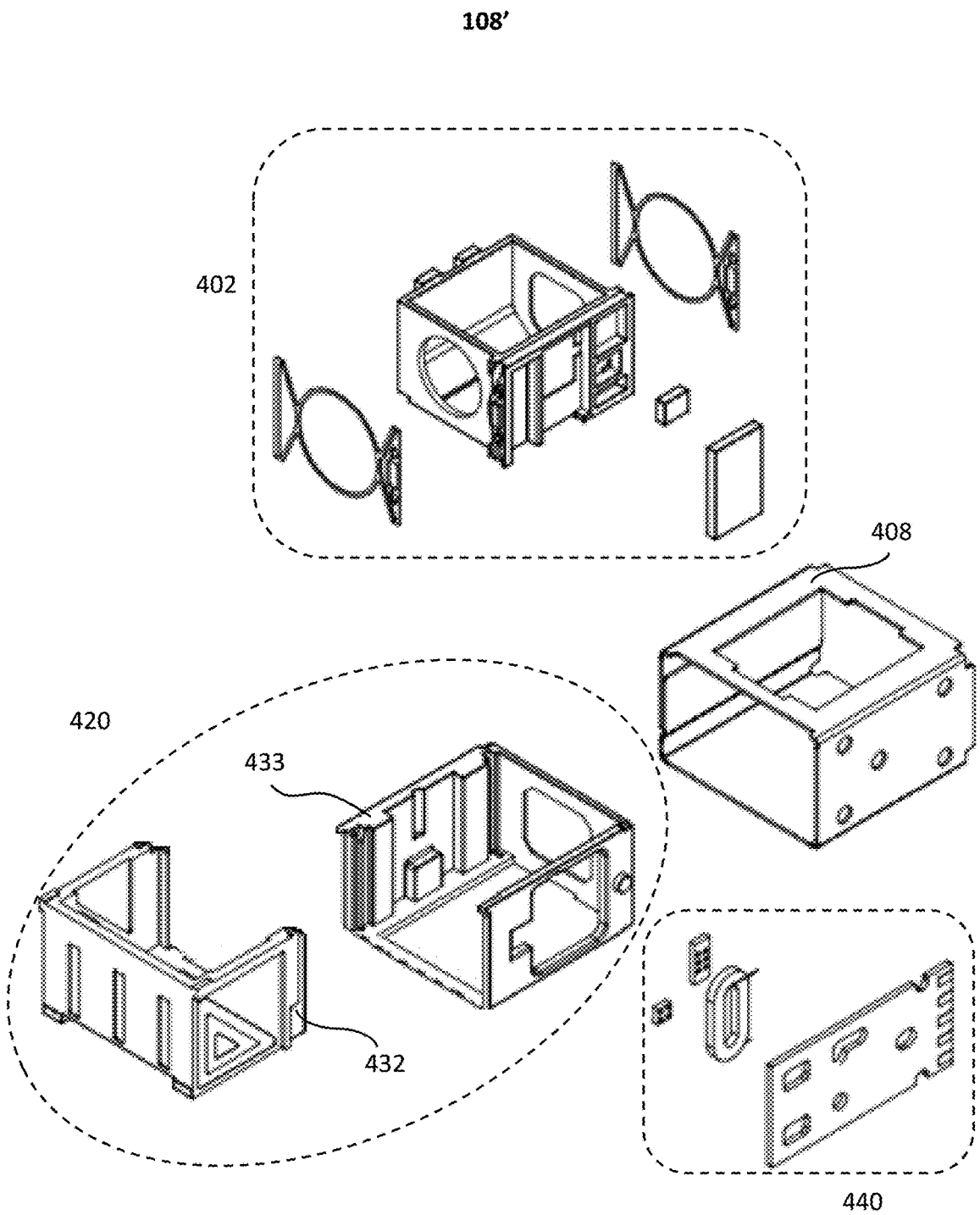
FIG. 4D shows another embodiment of an actuator of the folded camera of FIG. 1A.

Actuator 108 further includes an electronic sub-system 440, FIG. 4B shows electronic sub-system 440 from one side, and FIG. 4C shows electronic sub-system 440 from another side. Electronic sub-system 440 includes actuator PCB 442, a coil 444 and a driver integrated circuit (IC) 450. Coil 444 and IC 450 are soldered to actuator PCB 442, such that coil 444 is connected electrically to IC 450 and IC 450 is connected to four wiring pads 452a-d on actuator PCB 442. Wiring pads 452a-d are used to deliver electronics signals to IC 450. Four electrical signals typically included operating voltage (Vdd), ground (Gnd) and two signals used for IIC protocol (signal clock (SCL) and signal data (SDA))

as known in the art. In other embodiments, other protocols may be used, such as SPI protocol, known in the art, or IC 450 may need more than one operating voltage to operate; is such cases there may be more, or less, than 4 wiring pads, for example in the range of 2-8. Actuator PCB 442 is glued to base 420 from the outside such that coil 442 and IC 450 pass through a hole 420a in base 420, and such that coil 444 is positioned next to magnet 406, and IC 450 is positioned next to magnet 408. The typical distance of coil 444 to magnet 406, and of IC 450 to magnet 408 is in the range of 50-200 μm. This distance may allow actuated sub-assembly 402 to move along the Z axis without interference. In some embodiments, actuator 108 may work in an open-loop control method, as known in the art, i.e. where a current signal is sent to the coil without position control mechanism, Coil 444 has exemplarily stadium shape, typically with a few tens of windings (e.g. in a not limiting range of 50-250) and with a typical resistance of 10-30 ohm. Coil 444 is fixedly connected to IC 450, capable of sending input currents to coil 444. Current in coil 444 creates a Lorentz force due to magnetic field of magnet 406: exemplary a current in a clockwise direction will create a force in the positive Z direction, while a current in counterclockwise direction will create a force in the negative Z direction. The full magnetic scheme (e.g. the pole direction of fixed magnet 406) is known in the art, and described for example in detail in patent application PCT/IB2016/052179.

Figure 5A:
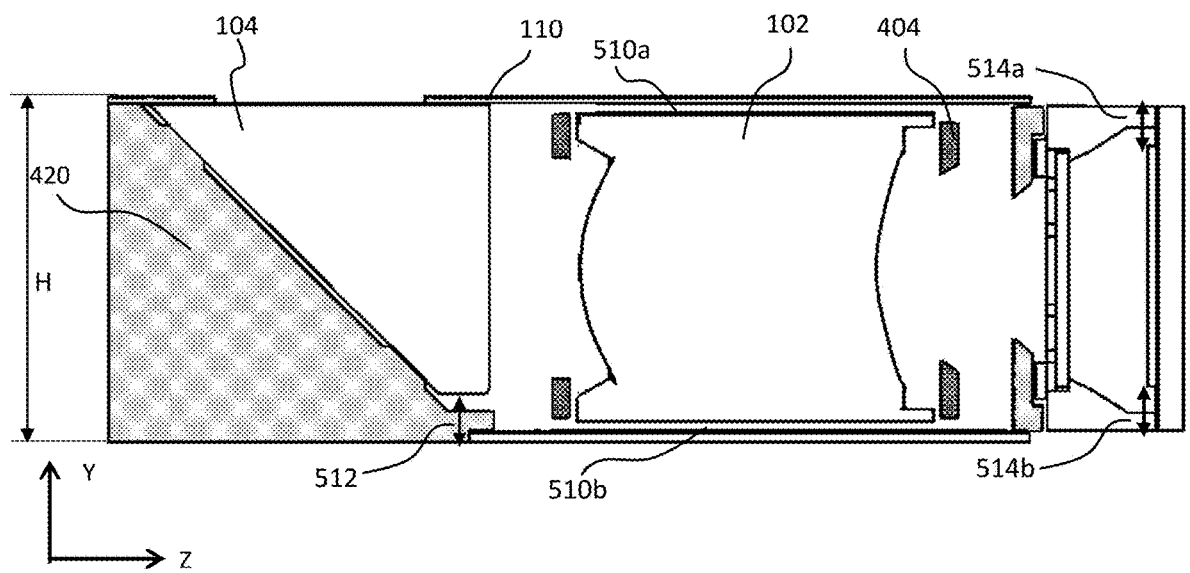
FIG. 5A shows a longitudinal cross section of a complete folded camera along a cut A-A in FIG. 1A.
Figure 5B:
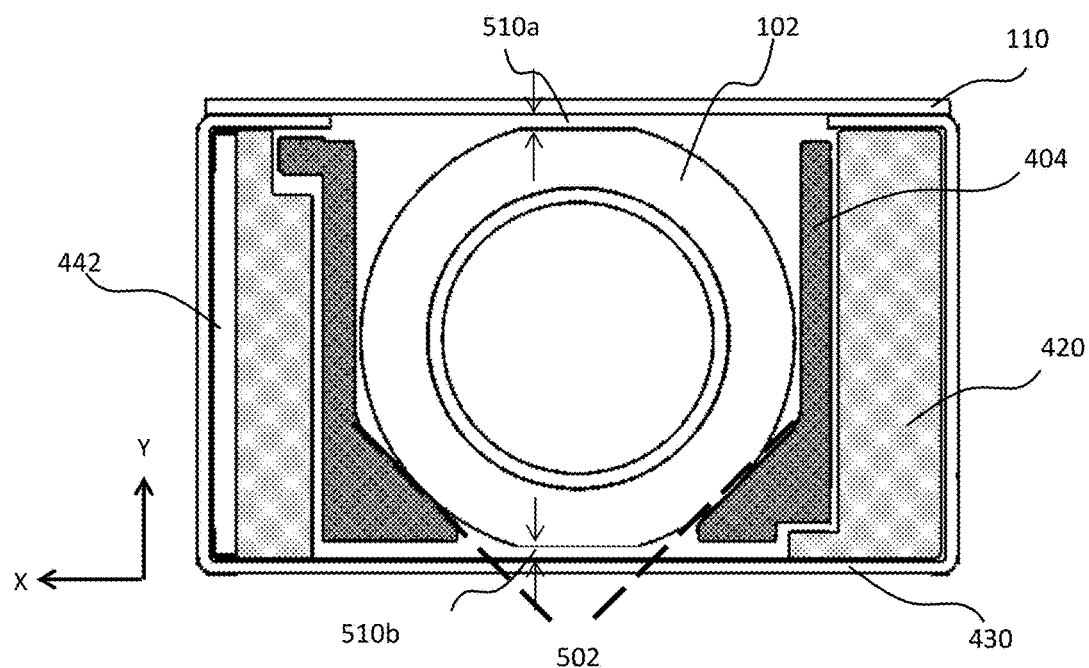
FIG. 5B shows a radial cross section of a complete folded camera along a cut B-B in FIG. 1A.

FIGS. 5A and 5B show, respectively, cross sections of a complete camera 100 along cuts A-A and B-B (FIG. 1A). Cuts A-A and B-B are respectively in Y-Z and X-Y planes. As shown in the cross section of FIG. 5B, lens carrier 404 may further include a V-groove 504 in its bottom. V-groove 504 allows pick-and-place mounting of lens 102 by insertion from top opening 410a without the need of active alignment (see below).

In the embodiment shown in FIG. 5A and FIG. 5B, that height H of camera 100 is equal to the height of lens 102+the thickness of bottom lid 412+the thickness of top lid 110+two air gaps 510a and 510b. Air gaps 510a-b are dimensioned to allow motion of lens 102 without interference during actuation. The motion of lens 102 is for focusing (and in particular for auto focusing) along the Z axis and\or for OIS along the X direction; actuation modes for both AF and OIS are known in the art. For example, in some embodiments, each air gap 510a or 510b may be larger than about 10 μm, for example in the range 10-50 μm, 10-100 μm or 10-150 μm. Thus, the structure of camera 100 maximizes the contribution of lens 102 to the total height of camera 100. In other embodiments, the camera height may slightly exceed H, for example by up to 300 μm, due to the OPFE or the image sensors having a height dimension slightly larger than H. To summarize, in camera 100 the height H is no more than about 600 μm above height 206 of lens 102. In this description, the use of the terms "about" or "substantially" or "approximately" with reference to height or another dimension mean, in some embodiments, the exact value of the height or dimension. In other embodiments, these terms mean the exact value plus a variation of up to 1% of the value, the exact value plus a variation of up to 5% of the value, or even the exact value plus a variation of up to 10% of the exact value.

Figure 6:
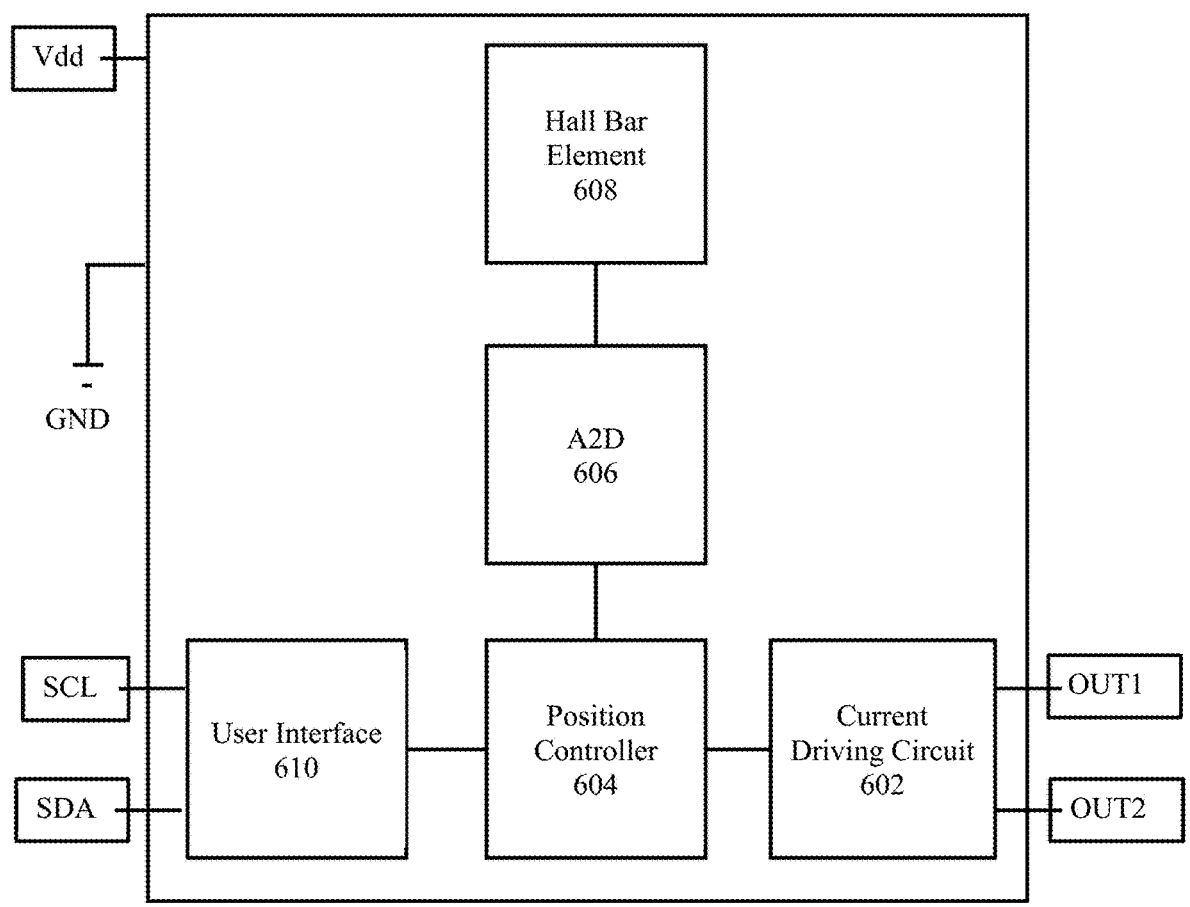
FIG. 6 shows the internal structure of a driver integrated circuit for the actuator.

FIG. 6 shows the internal structure of IC 450. IC 450 includes a current driving circuit 602, exemplary an H-bridge, a position (e.g. PID) controller 604, an analog to digital converter (A2D) 606, a Hall bar element 608 and a user interface 610. Upon actuation, the relative position of actuated sub-assembly 402 and Hall bar element 608 is changed. The intensity and direction of the magnetic field senses by Hall bar element 608 is changed as well. The output voltage of Hall element 608 is proportional to the magnetic field intensity. A2D 606 converts the voltage level to digital numbers which are input to position controller 604. Position controller 604 is used to control the position of the actuated sub-assembly and set to the position commands given by user in user interface 610. The control circuit output is the amount of current applied in coil 444. The full magnetic scheme (e.g. the pole direction of fixed magnet 408) is known in the art, and described for example in detail in PCT patent application PCT/IB2016/052179.

The description of actuator 108 provided herein is only an example. In other embodiments, the actuator may have a different guiding mechanism (for example a ball guided actuator as disclosed in co-owned patent application PCT/IB2017/054088), may include more actuation directions (for example an actuator including AF and OIS as disclosed in PCT/IB2017/054088), may have a different magnetic scheme (for example an actuator with magnetic reluctance magnetic scheme as disclosed in co-owned U.S. Pat. No. 9,448,382). In all such cases the actuator may be dimensioned/made/designed such that some or all of the following properties of camera 100 are preserved: (1) the height H is no more than about 600 μm above height 206 of lens 102; (2) the height H is substantially equal to a sum of the lens height (206), the first lid thickness, the shield thickness, the size of a first air gap between a first point on a surface of the lens facing the lid and the size of a second air gap being between a second point on a surface of the lens diametrically opposed to the first point and facing the shield; (3) there is no point on actuated sub-assembly 402 higher than point 206a and there is no point on actuated sub-assembly 402 lower than point 206b.

Figure 7:
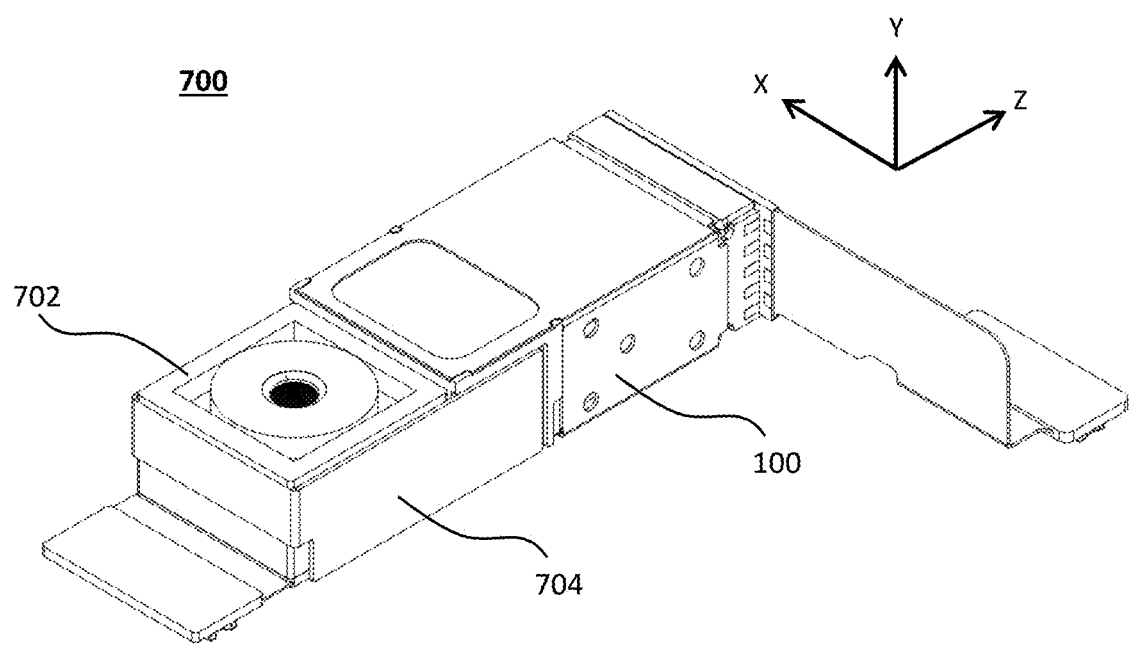
FIG. 7 shows schematically an example of a dual-camera including a folded camera as in FIG. 1A and an upright camera.

FIG. 7 shows a dual-camera 700 that includes for example a camera such as camera 100 as well as an upright camera 702, the latter known in the art. The operation of a dual-camera is known in the art, for example as described in co-owned patent applications PCT/IB2015/056004 and PCT/IB2016/052179. Camera 702 is fixedly attached to camera 100 close to OPFE 104. In embodiment 700, the location of camera 702 is to the negative Z side of folded camera 100, and the mechanical attachment is done using a bracket 704, normally made from stain-less steel. In other embodiments, camera 702 may be located on the negative or positive X side of camera 100, for example as described in PCT/IB2016/052179. In other embodiments camera 702 may be attached to camera 100 by other ways and means than by bracket 704.

Example of Folded Camera Assembly Process

In one embodiment, an example assembly process (method) for a folded camera described with reference to FIG. 8A may include, after a known in the art assembly of an actuator such as actuator 108:

Step 1: Insertion of lens 102 into actuator 108 and attaching it to lens carrier 404 from the top (Y direction, perpendicular to optical axis 114) using e.g. a pick-and-place method. This can be achieved because of top opening 431 left in shield 430 of actuator 108 and opening 410a left in lens carrier 404 of actuator 108, and because of the mechanical structure of lens carrier 404 and base 420. When inserting lens 102, air gap 510b is formed below lens 102 and above shield 430.

Step 2: Insertion of OPFE 104 into base 420 of actuator 108 from the top (Y direction, perpendicular to optical axis 114) using e.g. a pick-and-place method. This can be achieved because of the mechanical structure of base 420.

Step 3: Fixedly attach top lid 110 to the top surface of shield 430. When fixing top lid 110, air gap 510a is formed above lens 102 and below lid 110.

Step 4: Installation of image sensor-PCB sub-assembly 106. Sensor 116 may be installed using two optional methods: (1) an active alignment process or (2) a mechanical alignment process. The two alignment processes allow setting the image sensor perpendicular to optical axis 114 with different accuracy, as known in the art.

The creation of air gaps 510a, 510b in respectively steps 1 and 3 above allows motion of lens 102 relative to the other parts of camera 100.

The assembly process above (steps 1-4) is relevant to a folded camera as in FIG. 1B and FIG. 5B. In some other embodiments, for example as in FIGS. 1C and 1D, the assembly process may include insertion of the OPFE from one side and insertion of the lens from the opposite side. In yet other embodiments, the insertion of the lens may be through a bottom opening (not shown) in a bottom surface of the shield opposite to the top opening above, and the bottom opening is then further covered by a bottom shield lid (not shown), which may have the same or similar thickness as the top lid.

In yet other embodiments with an actuator such as actuator 108' where the base is separated into two parts, OPFE 104 may be installed from other directions (top or front) in base back side 432. In this case, base back side 432 may be attached to actuator 108' after the OPFE and lens installation in a step 2' between steps 2 and 3 (FIG. 8B).

As used herein, the phrase "for example," "such as", "for instance" and variants thereof describe non-limiting embodiments of the presently disclosed subject matter. Reference in the specification to "one case", "some cases", "and other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

It is appreciated that certain features of embodiments disclosed herein, which are, for clarity, described in the context of separate embodiments or examples, may also be provided in combination in a single embodiment. Conversely, various features disclosed herein, which are, for brevity, described in the context of a single embodiment, may also be provided separately or in any suitable sub-combination or as suitable in any other described embodiment disclosed herein. Certain features described in the context of various embodiments are not to be considered essential features of those embodiments, unless the embodiment is inoperative without those elements.

In embodiments of the presently disclosed subject matter one or more steps illustrated in FIGS. 8A and 8B may be executed in a different order and/or one or more groups of steps may be executed simultaneously.

All patents and patent applications mentioned in this specification are herein incorporated in their entirety by reference into the specification, to the same extent as if each individual patents and patent application was specifically and individually indicated to be incorporated herein by reference. In addition, citation or identification of any reference in this application shall not be construed as an admission that such reference is available as prior art to the present invention.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A method for assembling a folded camera, comprising:
  a) providing an actuator for the folded camera, the actuator having a shield;
  b) inserting a lens of the folded camera into the actuator through an opening in the shield, the lens having a lens optical axis;
  c) inserting an optical path folding element (OPFE) into the actuator, wherein the OPFE folds light arriving from a first direction to a second direction, wherein the top surface of the shield faces the light from the first direction and wherein the lens optical axis is substantially parallel to the second direction;
  d) covering the shield opening with a lid; and
  e) attaching an image sensor of the folded camera to the actuator such that it lies in a plane substantially perpendicular to the optical axis.

2. The method of claim 1, wherein the covering the shield opening with a lid includes fixedly attaching the lid to the shield.

3. The method of claim 1, wherein the opening is a top opening in the shield, and wherein the inserting the OPFE into the actuator includes inserting the OPFE from a top surface of the actuator.

4. The method of claim 1, wherein the opening is a top opening in the shield, and wherein the inserting the OPFE into the actuator includes inserting the OPFE from a bottom surface of the actuator.

5. A method for assembling a folded camera, comprising:
  a) providing an actuator for the folded camera, the actuator having a shield and a base separated into a back base part and a front base part;
  b) inserting a lens of the folded camera into the actuator through an opening in the shield, the lens having a lens optical axis;
  c) inserting an optical path folding element (OPFE) into the actuator back base part, wherein the OPFE folds light arriving from a first direction to a second direction, wherein the top surface of the shield faces the light from the first direction and wherein the lens optical axis is substantially parallel to the second direction;
  d) attaching the back base part to the front base part;
  e) covering the shield opening with a lid; and
  f) attaching an image sensor of the folded camera to the actuator such that it lies in a plane substantially perpendicular to the optical axis.

* * * * *